US007849966B2

(12) United States Patent
Chiu

(10) Patent No.: US 7,849,966 B2
(45) Date of Patent: Dec. 14, 2010

(54) COLLAPSIBLE STAND FOR MACHINE

(75) Inventor: Cheng-Hung Chiu, Taichung Hsien (TW)

(73) Assignee: Rexon Industrial Corporation Ltd., Taichung Hsien (TW)

( * ) Notice: Subject to any disclaimer, the term of this patent is extended or adjusted under 35 U.S.C. 154(b) by 1156 days.

(21) Appl. No.: 11/504,065

(22) Filed: Aug. 15, 2006

(65) Prior Publication Data

US 2007/0102892 A1 May 10, 2007

(30) Foreign Application Priority Data

Nov. 9, 2005 (TW) .............................. 94139329 A

(51) Int. Cl.
*B62B 3/02* (2006.01)

(52) U.S. Cl. ........................................ 182/153; 280/35

(58) Field of Classification Search ................. 182/153, 182/154; 248/588, 164; 280/35, 641
See application file for complete search history.

(56) References Cited

U.S. PATENT DOCUMENTS 2,096,994 A * 10/1937 Millen ......................... 280/38
2,372,003 A * 3/1945 Kennedy ..................... 182/82
3,655,212 A * 4/1972 Krass et al. ................. 280/641
4,558,648 A 12/1985 Franklin et al.
4,611,823 A 9/1986 Haas
4,728,118 A 3/1988 Haas
4,967,672 A 11/1990 Leather
4,969,496 A 11/1990 Romans
5,087,013 A 2/1992 Gress et al.
5,325,640 A 7/1994 Luedke et al.
5,454,575 A * 10/1995 Del Buono ................... 280/35
5,560,582 A * 10/1996 Beelen ....................... 248/588
5,603,491 A 2/1997 Murrell
5,816,374 A * 10/1998 Hsien ......................... 190/115
5,862,898 A * 1/1999 Chang ........................ 190/115
5,934,641 A 8/1999 Vince
6,182,935 B1 2/2001 Talesky
6,360,797 B1 3/2002 Brazell et al.
6,471,220 B1 10/2002 Babb
6,578,856 B2 6/2003 Kahle
D486,504 S 2/2004 Huang
6,886,836 B1 5/2005 Wise
6,899,306 B1 5/2005 Huang
6,942,229 B2 * 9/2005 Brazell et al. ................. 280/30

(Continued)

FOREIGN PATENT DOCUMENTS

CN 2573185 9/2003

(Continued)

*Primary Examiner*—Alvin C Chin-Shue
(74) *Attorney, Agent, or Firm*—Bacon & Thomas, PLLC

(57) ABSTRACT

A collapsible stand includes a platform for supporting a machine, two first legs each having a top end pivotally connected to the platform, two second legs each of which is pivotally connected to each first leg and has a top part slidably inserted through a sleeve of the platform, at least one springy or biasing member and a locking device. The springy or biasing member is retained in a sleeve-like or coaxial manner on retained in a sleeve-like manner one of the second legs. The locking device is connected to the platform for fixing the second legs in position after spreading the stand open such that the first legs and second legs support the platform at a predetermined height.

12 Claims, 12 Drawing Sheets

U.S. PATENT DOCUMENTS

| | | | | |
|---|---|---|---|---|
| D519,747 | S | 5/2006 | Wu | |
| D523,041 | S | 6/2006 | Wise | |
| 7,059,616 | B2 | 6/2006 | Wu | |
| 7,334,592 | B2 * | 2/2008 | Tartaglia | 135/85 |
| 2005/0011421 | A1 | 1/2005 | Zhang | |
| 2005/0045781 | A1 | 3/2005 | Brazell | |
| 2005/0120849 | A1 | 6/2005 | Lee | |
| 2005/0120922 | A1 | 6/2005 | Brooks | |
| 2005/0133682 | A1 | 6/2005 | Huang | |
| 2005/0194215 | A1 | 9/2005 | Radermacher | |
| 2005/0199768 | A1 | 9/2005 | Tam et al. | |
| 2006/0071450 | A1 | 4/2006 | Wu | |
| 2006/0076756 | A1 | 4/2006 | Wu | |

FOREIGN PATENT DOCUMENTS

| | | | |
|---|---|---|---|
| DE | 26 45 773 | A1 | 4/1978 |
| EP | 0 532 132 | A2 | 3/1993 |
| GB | 2 363 366 | A | 12/2001 |
| WO | WO 03/064115 | A1 | 8/2003 |

* cited by examiner

COLLAPSIBLE STAND FOR MACHINE

BACKGROUND

1. Field of the Invention

The present invention relates to a collapsible stand for supporting a machine, and more particularly the collapsible stand can easily and conveniently be spread open for use and folded for carrying and/or storage.

2. Description of the Related Art

U.S. Pat. No. 6,942,229B2, discloses a collapsible stand for a bench-top power tool. In the patent, as shown in FIGS. 10 and 11, the stand 80 includes a platform 81 on which a table saw 82 is mounted, two first legs 83 are pivotally connected to the bottom side of the platform 81, two second legs 84 are respectively connected to the two first legs 83 in a crossed manner, and two wheels 85 are bilaterally connected to the front part of the platform 81. When wanting to move the table saw 82, the user must turn the table saw 82 and the platform 81 from a horizontal position to a vertical position in order to place the front side of the table saw in contact with the floor, and then fold the first legs 83 and the second legs 84. After finishing the procedure, the user can pull or push the stand 80 to move. In this manner, turning and then folding the stand 80, is complicated and inconvenient. Moreover, the operation is not easy for the user and the user is further in danger when turning the table saw 82 and the platform 81 from the horizontal to the vertical by himself because of the heavy weight of table saw 82 and the stand 80.

FIG. 12 shows a foldable stand for a threading machine according to U.S. Pat. No. 5,560,582. In the patent, the foldable stand 90 has a gas spring 91 and a piston rod 92 installed in the gas spring 91. By means of the relative action between the gas spring 91 and the piston rod 92, a damping resistance is provided to buffer the weight of the threading machine for preventing an accident when folding up the foldable stand 90. However, it is expensive to use the gas spring 91 and the piston rod 92 to produce a damping resistance.

Further, the stand 90 has two wheels 94 respectively rotatably provided at the bottom ends of two legs 93 to make the stand 90 easy to move when collapsed. When the stand 90 is spread to the open position, the two wheels 94 form bearing points in order to support the stand 90 on the floor. However, the rotatable connection between the wheels 94 and the bottom ends of two legs 93 is not stable. The stand 90 may be easily vibrated upon any external force.

SUMMARY

The present invention has been accomplished in view of the circumstances discussed above. It is therefore one objective of the present invention to provide a collapsible stand that can be conveniently and easily spread open for use and folded for carrying and/or storage.

To achieve this objective of the present invention, the collapsible stand provided by the present invention comprises a platform for supporting thereon a machine, two first legs, two second legs, at least one first springy or biasing member and a locking means. The platform has two sleeves pivotally connected thereon. The two first legs each have a top end pivotally connected to the platform. Each second leg is pivotally connected to each first leg at a pivot point and has a top part inserted through the sleeve and slidable along the sleeve resulting in relative movement with respect to the platform. The first springy or biasing member is retained in a sleeve-like or coaxial manner on one of the second, and is located between the sleeve and the pivotal point, and is stopped against the sleeve. The locking means is connected to the platform for fixing the second legs after spreading the stand opensuch that the first legs and second legs support the platform at a predetermined height. The top parts of the second legs protrude out of the platform and the first springy or biasing member is compressed after the locking means releases the second legs and then the stand is folded.

By means of the locking means, the two second legs can be conveniently locked relative to the platform after the stand is spread open and released from the locked position when the user wants to fold the stand. By means of the assembly of the locking means, the two sleeves and the two pairs of the first leg and the interconnected second leg, the user can easily spread open or fold the collapsible stand without turning it over. Further, when the user folds the stand, the springy or biasing member provides a damping resistance to the platform to help the user smoothly and stably lower the platform and the machine supported on the platform. Furthermore, when the stand is spread open, the springy or biasing member provides a rebound force to the platform, thereby enabling the user to lift the platform and the machine with less effort. In a preferred embodiment of the present invention, the springy or biasing member is a spring so as to reduce the manufacturing cost of the stand. In addition, after the stand is spread open, the stand is steadily supported on the floor by the stable structure thereof. Thereby, the present invention improves upon the disadvantages of the prior stands.

DETAILED DESCRIPTION

Figure 1:
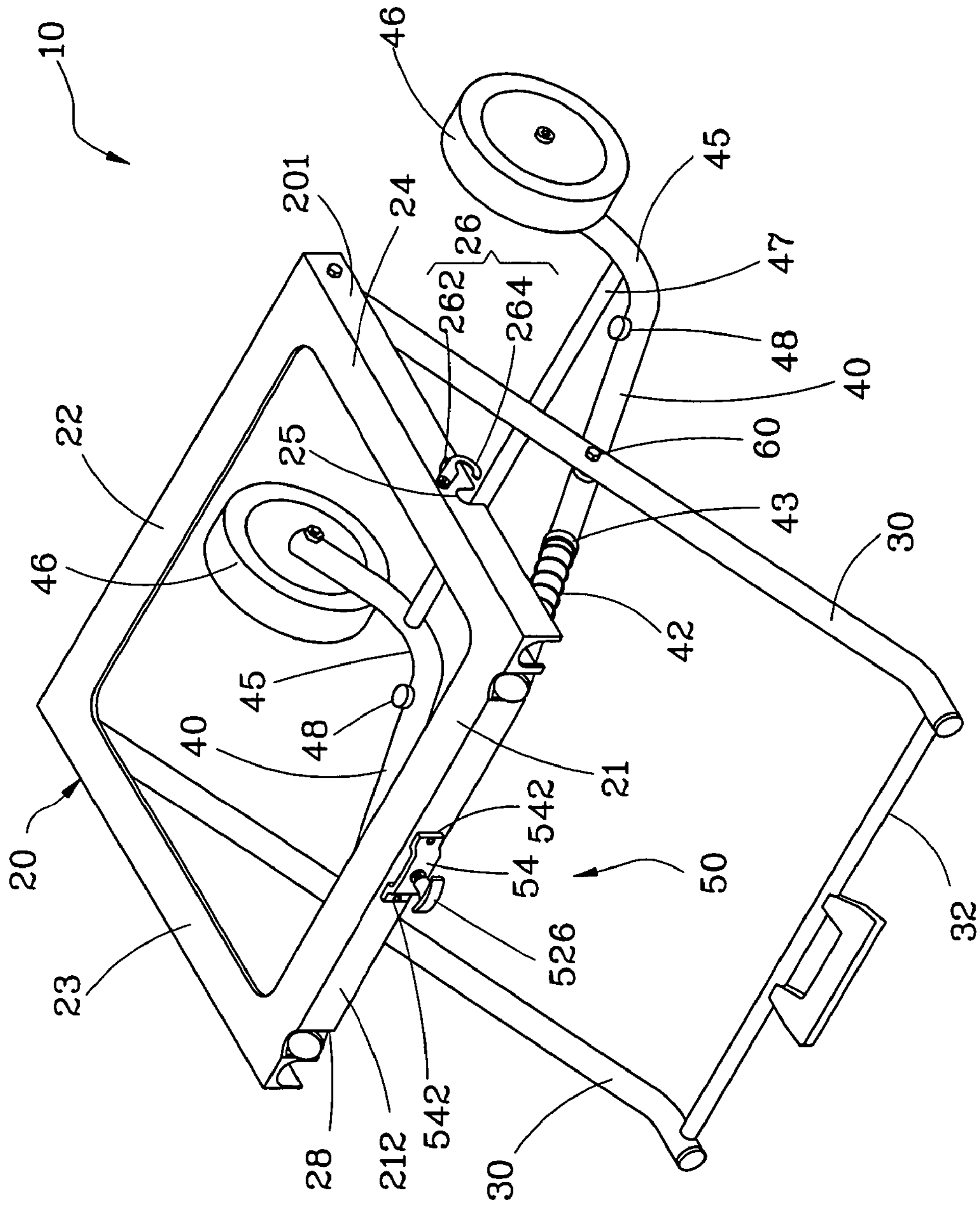
FIG. 1 is a perspective view showing a collapsible stand spread open in accordance with a first preferred embodiment of the present invention.
Figure 2:
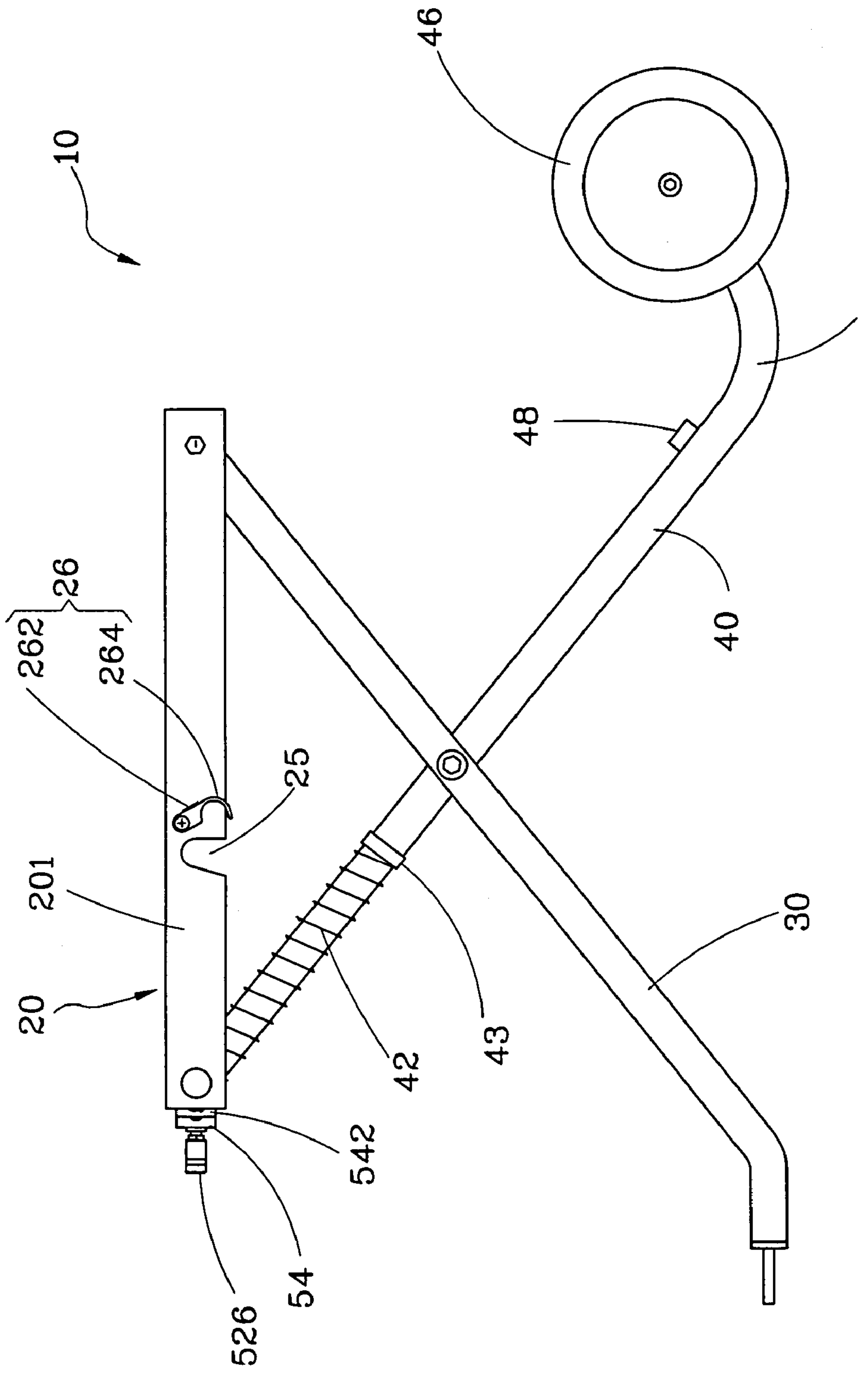
FIG. 2 is a side view of the collapsible stand spread open according to the first preferred embodiment of the present invention.

As shown in FIGS. 1 and 2, a collapsible stand 10 in accordance with a first preferred embodiment of the present invention has a platform 20, two first legs 30, two second legs 40, two first springy or biasing members 42, and a locking device 50.

The platform 20 is adapted to carry a machine (not shown), such as a wood working machine (e.g., table saw, miter saw, scroll saw, band saw, drill press, sander, etc.). The platform 20 can be a plate or a frame. According to this embodiment, the platform 20 is a rectangular frame, having a front frame part 21, a rear frame part 22, a left frame part 23, and a right frame part 24. An outside wall 201 of each of the left frame part 23 and the right frame part 24 has an arched notch 25. Two swivel hooks 26 are respectively pivotally mounted to the outside walls 201 of the left frame part 23 and the right frame part 24 adjacent to the arched notches 25. Each of the swivel hooks 26 has a hooked portion 264 pivotally connected to the outside wall 201 over and near the arched notch 25, and a handle 262 extending outward from the hooked portion 264. Two sleeves 28 are respectively pivotally connected to a portion of the platform 20 that is adjacent to the junction of the front frame part 21 and the left frame part 23 and another portion of the platform 20 that is adjacent to the junction of the front frame part 21 and the right frame part 24.

The top ends of the first legs 30 are respectively pivotally connected to the junction of the rear frame part 22 and the left frame part 23 and the junction of the rear frame part 22 and the right frame part 24, and their bottom ends are bent forward for contacting the floor. Further, a transverse handlebar 32 is connected between the bottom ends of the first legs 30.

Each of the second legs 40 is pivotally connected in a crossed manner to each of the first legs 30 by a pin 60 which acts as the pivot at a pivotal point. The pin 60 is inserted through the first leg 30 and the interconnected second leg 40 at the pivotal point, and has a part protruding from the first leg 30 that is located at an outside relative to the interconnected second leg 40. The second legs 40 each have a top part slidable through the sleeve 28 relative to the platform 20, and a bottom part with a bent portion 45 curved upwards and having a wheel 46 rotatably connected near its terminal end. When the stand 10 is spread open and positioned on the floor, the bottom ends of the first legs 30 and the bent portions 45 of the second legs 40 respectively serve as bearing portions of the stand 10 on the floor, and the wheels 46 are spaced above the floor. Each second leg 40 has a locating hole 44 near its top part through its inner side (see FIG. 3), a flange 43 extending around its periphery between the locating hole 44 and the pin 60, and a buffer or bumper 48 disposed above the bent portion 45. Further, a transverse connecting bar 47 is connected between the bent portions 45 of the second legs 40 for stabilizing the second legs 40 when they stand on the floor.

In this preferred embodiment, the first springy or biasing member 42 is a spring retained in a sleeve-like or coaxial manner on the top part of the second leg 40, located between the sleeve 28 and the pivotal point, and stopped against the sleeve 28 and the flange 43 of the second leg 40.

Figure 3:
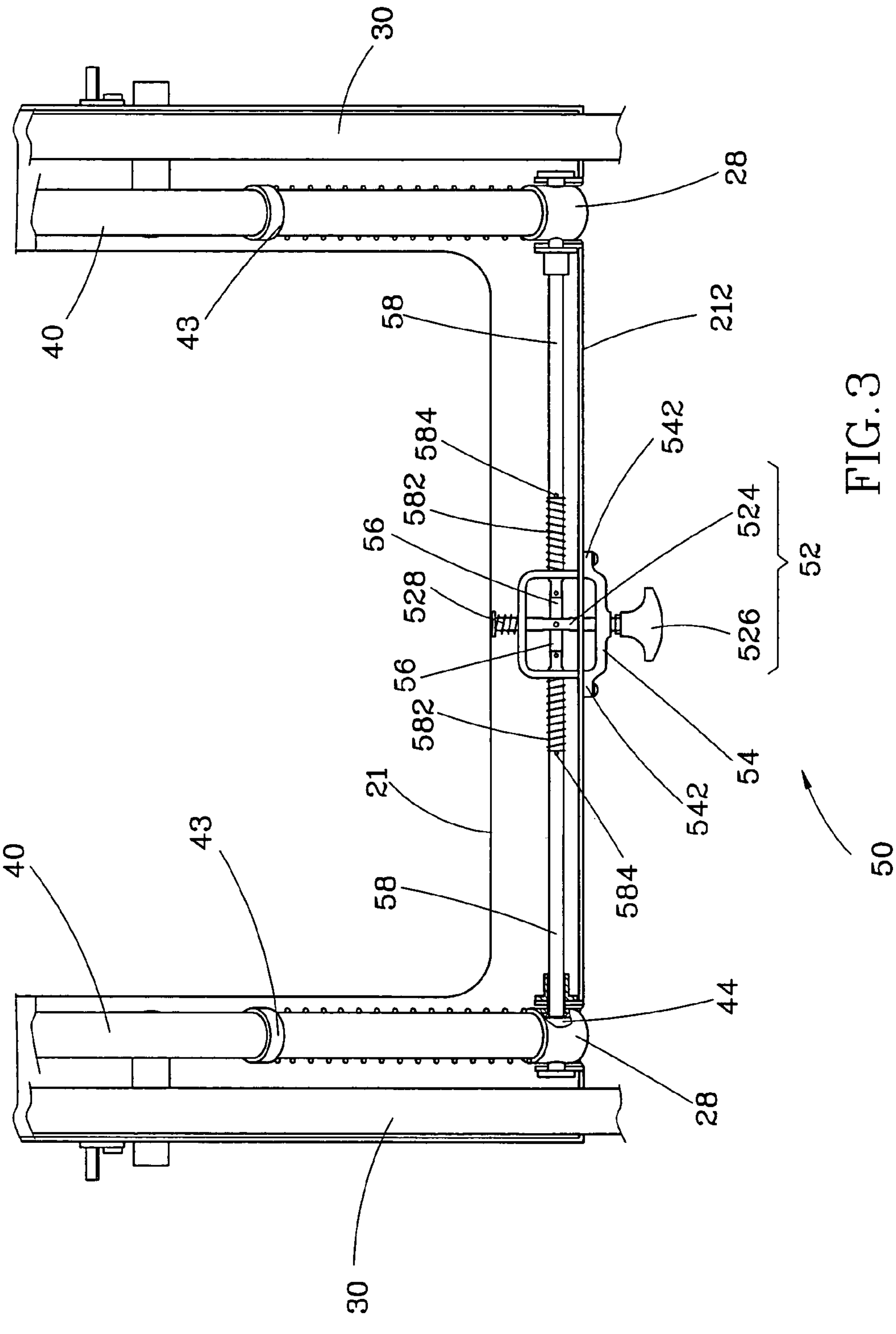
FIG. 3 is a bottom view showing the structure of a locking device of the collapsible stand in the first preferred embodiment of the present invention.

The locking device 50 is adapted to fix the second legs 40 in a locked position after the stand 10 is spread open as shown in FIG. 1. In this preferred embodiment, as shown in FIG. 3, the locking device 50 comprises an operating handle 52, a locating frame 54, two first links 58, and two second links 56. The operating handle 52 has an elongated handle body 524, and a head 526. The locating frame 54 is inserted through the front wall 212 of the front frame part 21 of the platform 20, having two mounting lugs 542 disposed at its two sides and affixed to the front wall 212 of the front frame part 21 of the platform 20. The elongated handle body 524 is inserted through the front and rear sides of the locating frame 54 and the front wall 212. A second springy or biasing member 528, for example a spring, is positioned around the elongated handle body 524, having one end stopped at the rear side of the locating frame 54 and the other end stopped at the rear end of the elongated handle body 524. The head 526 is fixedly connected to the front end of the elongated handle body 524 and disposed outside the locating frame 54 and the platform 20 for operation by the user.

Figure 6:
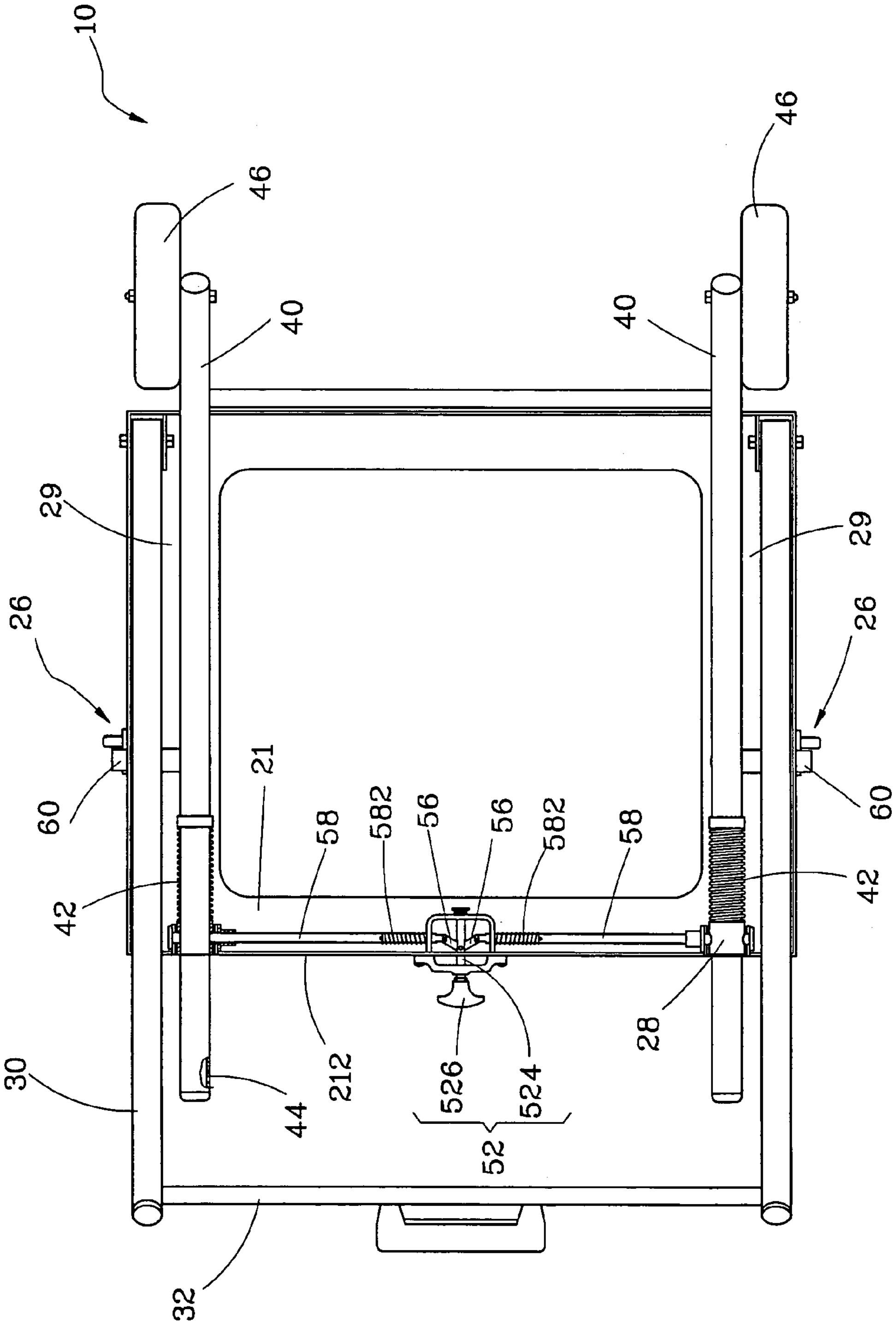
FIG. 6 is a bottom view showing the collapsible stand in a folded position according to the first preferred embodiment of the present invention.

The two second links 56 are respectively made of a metal strip and arranged at two opposite sides of the elongated handle body 524 of the operating handle 52. Each second link 56 has a front end pivotally connected to the elongated handle body 524 and a rear end pivotally connected to the first links 58. The first links 58 are respectively made of a round metal rod, and the axial direction of the first link 58 is substantially perpendicular to the axial direction of the handle body 524. Each first link 58 has a front end inserted through the locating frame 54 and pivotally connected to the rear end of the corresponding second link 56, and a rear end inserted into the locating hole 44 of the corresponding second leg 40 to fix or lock the second legs 40 in position relative to the platform 20, such that the first legs 30 and the second legs 40 support the platform 20 at a predetermined height above the floor. In other words, the operating handle 52 is movable between a first position, as shown in FIG. 3, for moving the first links 58 to a locking position to lock the second legs 40 and a second position, as shown in FIG. 6, for moving the first links 58 to an unlocking position to release the second legs 40. In addition, two third springy or biasing members 582, which are springs in this preferred embodiment, are respectively retained in a sleeve-like or coaxial manner on a front end of the first links 58 and stopped against the locating frame 54 and a protrusion 584 of the first links 58.

Figure 4:
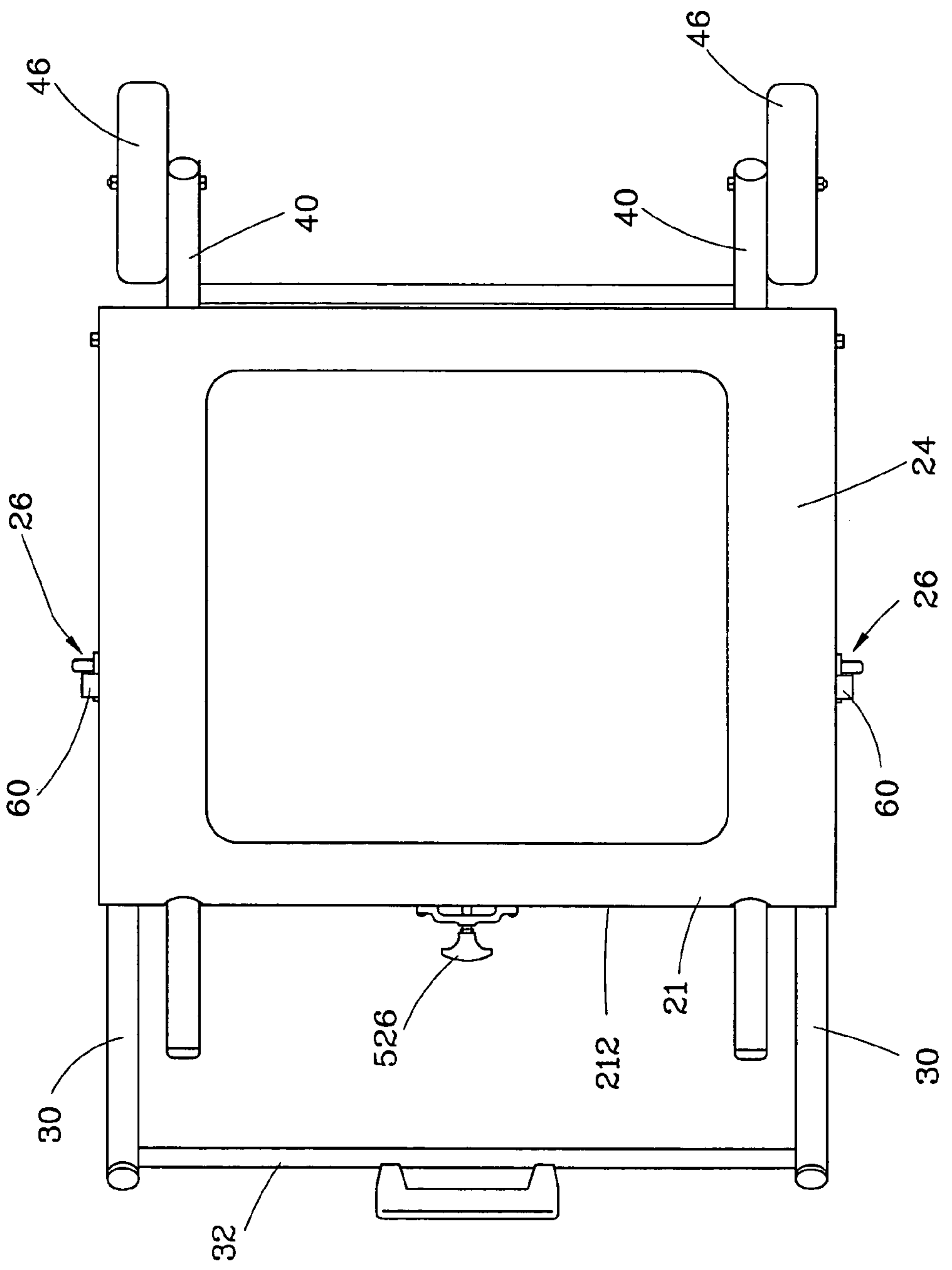
FIG. 4 is a top view showing the collapsible stand in a folded position according to the first preferred embodiment of the present invention.
Figure 5:
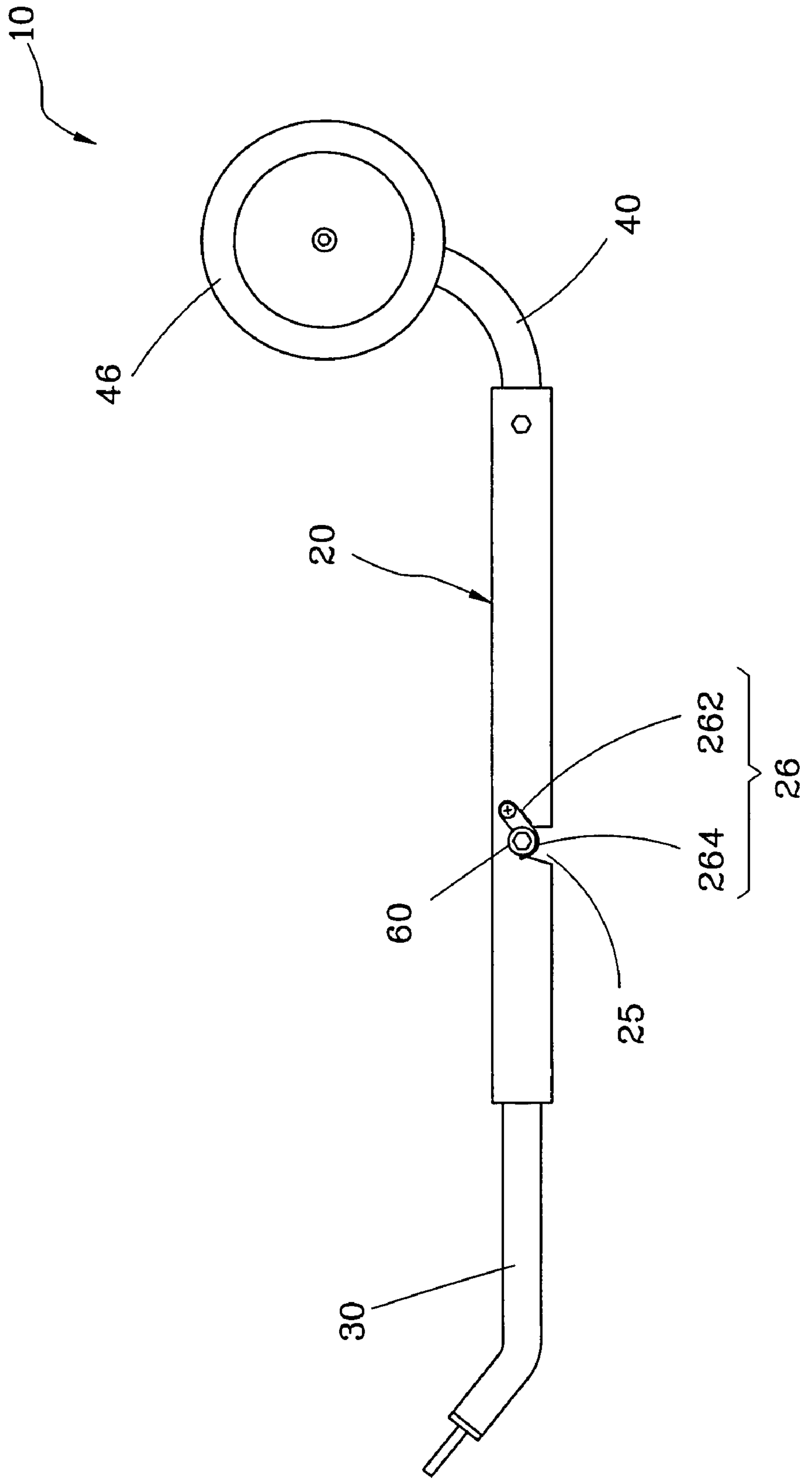
FIG. 5 is a side view showing the collapsible stand in a folded position according to the first preferred embodiment of the present invention.

Referring to FIGS. 4-6, in order to fold the stand 10, pull the head 526 of the operating handle 52 outward with one single hand and thus compress the spring 528. At this time, the two second links 56 are carried by the elongated handle body 524 toward the front wall 212 of the front frame part 21 of the platform 20 (see FIG. 6), and the two first links 58 are pulled by the second links 56 out of the locating holes 44 of the second legs 40, and the third springy or biasing members 582 are also compressed. Therefore, the stand 10 is gradually lowered. At this time, the top parts of the second legs 40 are guided by the corresponding sleeves 28 and project outward from the outside of the front wall 212 of the front frame part 21 of the platform 20, and the first legs 30 are rotated relative to the platform 20 until the two pairs of the first leg 30 and the interconnected second leg 40 are respectively received in two receiving spaces 29 defined by the inner side of the left frame part 23 and right frame part 24. After the first legs 30 and the second legs 40 are received in the receiving spaces 29, the top parts of the second legs 40, the two wheels 46 at the bottom ends of the second legs 40, and the bottom ends of the first legs 30 are disposed outside the platform 20. As a result, the handlebar 32 is also disposed outside the platform 20 and spaced away from the front wall 212 of the front frame part 21 of the platform 20 at a predetermined distance.

When the stand 10 is folded, the two pins 60 that extend through the first legs 30 are respectively received in the arched notches 25 and protrude from the platform 20. At this time, the user can turn the handles 262 of the swivel hooks 26 to make the corresponding hooked portions 264 hook the protruding parts of the pins 60 respectively to fix the two pairs of the first leg 30 and the interconnected second leg 40 relative to the platform 20. Therefore, the platform 20, the first legs 30 and the second legs 40 are locked together, and are not separated from each other due to the first springy or biasing members 42, as shown in FIGS. 4-6.

Further, when folding the stand 10, the two first springy or biasing members 42 that are respectively retained in a sleeve-like or coaxial manner on the top parts of the second legs 40 and stopped between the sleeves 28 and the flanges 43 of the second legs 40 are compressed to provide a damping resistance to the platform 10, and therefore the platform 10 can be lowered gradually and smoothly. After the stand 10 has been collapsed, the buffers or bumpers 48 of the two second legs 40 are disposed between the second legs 40 and the platform 20, absorbing any impact of the platform 20 against the second legs 40. After the stand 10 has been collapsed and locked, the user can lift the handlebar 32 and move the stand 10 on the floor by means of the wheels 46.

In order to use the stand 10, the user can turn the handles 262 of the swivel hooks 26 to make the hooked portions 264 of the swivel hooks 26 release the corresponding pins 60, step on the handlebar 32 to hold down the handlebar 32 on the floor, and then lift the platform 20 with the hands. At this time, the compressed first springy or biasing members 42 provide a rebound force to the platform 20, and therefore the user can lift the platform 20 with less effort. After lifting the platform 20 from the folded status toward the spread open status, the top parts of the second legs 40 move backward into the sleeves 28 inside the front frame part 21 of the platform 20, and the third springs 582 in a compressed state around the first links 58 and the second springs 582 in a compressed state around the elongated handle body 524 provide an outward force to force the first links 58 to move into the locating holes 44 of the second legs 40. Thereby, the locking device 50 fixes the second legs 40 in a locked position relative to the platform 20 so that the stand 10 is supported at a predetermined height.

According to the aforesaid embodiment, the springy or biasing members 582 and 528 are used to return the two first links 58 and the handle 52 so as to force the two first links 58 to lock the two second legs 40. In another practice, simply using the third springy or biasing members 582 or the second spring member 528 can also achieve the same effect.

By means of the locking device 50, the two second legs 40 can conveniently be locked relative to the platform 20 after the stand 10 is spread open. In order to fold the stand 10, the user can also operate the locking device 50 to release the lock of the second legs 40 from the platform 20. By the assembly of the locking device 50, the sleeves 28, and the two pairs of the first legs 30 and the interconnected second legs 40, the user can fold and spread open the stand 10 conveniently without turning over the stand 10. Further, when folding the stand 10, the first springy or biasing members 42 provide the damping resistance to the platform 20, thereby enabling the user to lower the platform 20 and the machine carried on the platform 20 smoothly. When spreading the stand 10 open, the first springy or biasing members 42 provide the rebound force to the platform 20, thereby enabling the user to lift the platform 20 and the machine carried on the platform 20 with less effort. Further, after the stand 10 is spread open, it is more stable to bear the stand 10 on the floor by use of the bent portions 45 of the second legs 40 than the wheels 94 in the prior art device, and the first springy or biasing members 42 of springs are inexpensive in the disclosed embodiment.

Furthermore, each the second leg 40 can include another locating hole at its inner side. When the stand 10 is folded in the collapsed status, the compressed third springy or biasing members 582 then may force the first links 58 into the other locating holes at the second legs 40 to lock the second legs 40 in position at the collapsed status. This design can be used as a substitute for the design of the swivel hooks 26 and the arched notches 25.

Figure 7:
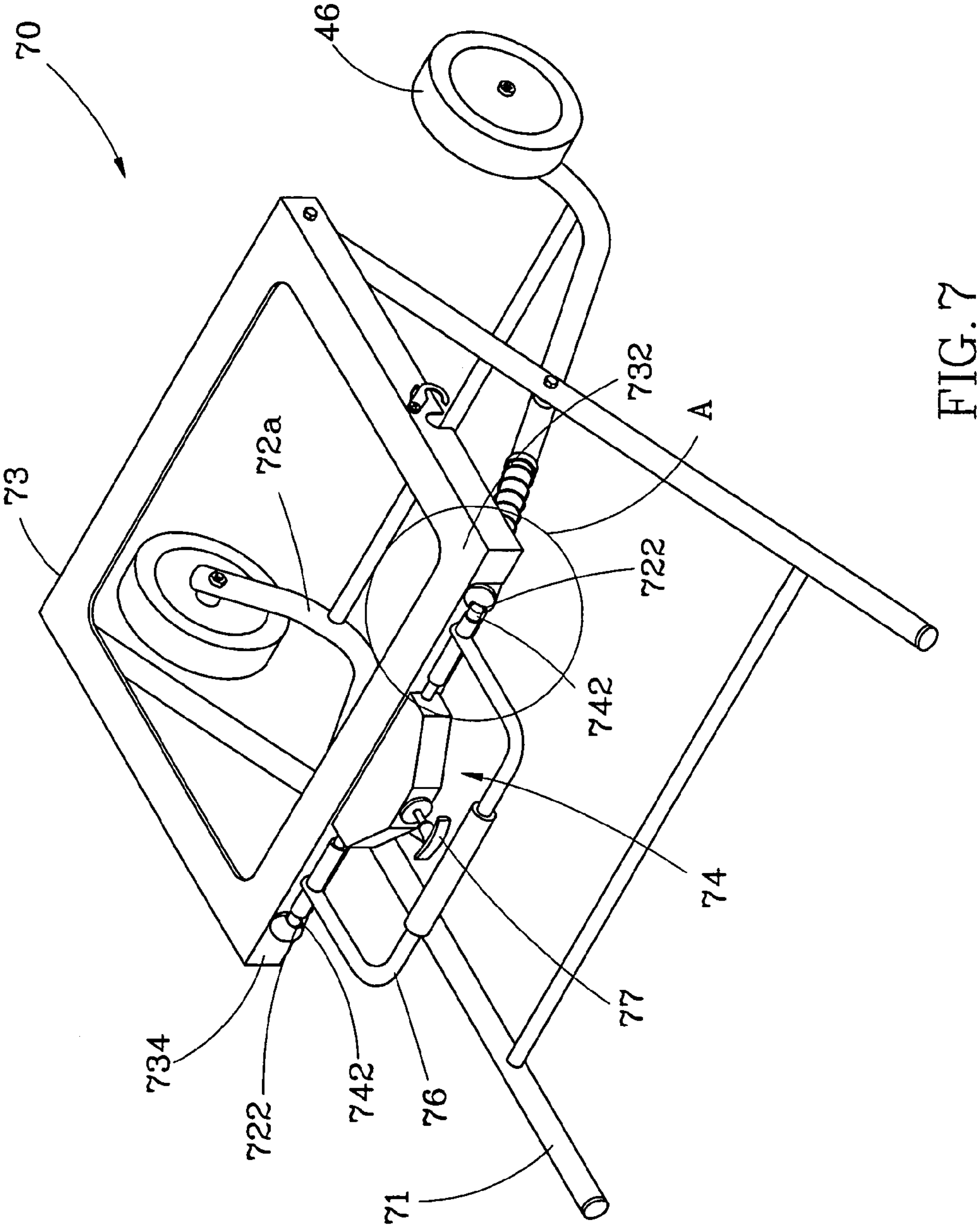
FIG. 7 is a perspective view showing a collapsible stand spread open in accordance with a second preferred embodiment of the present invention.
Figure 8:
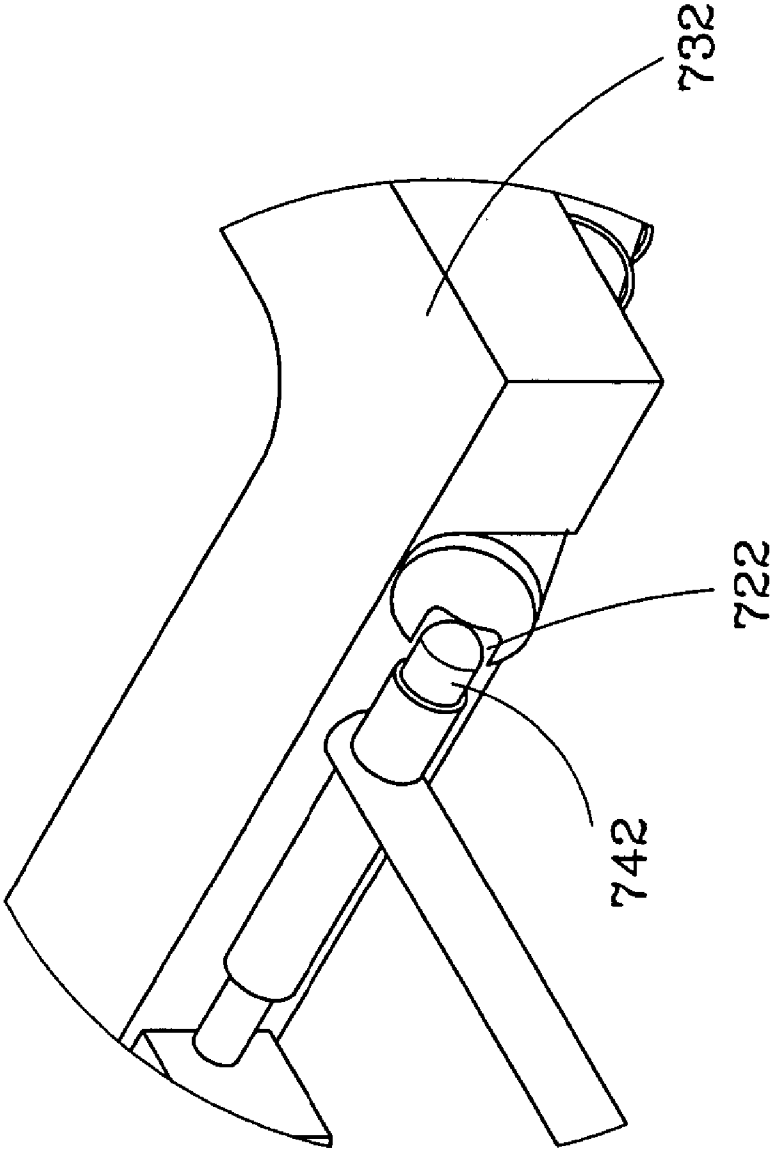
FIG. 8 is an enlarged view of part A of FIG. 7.
Figure 9:
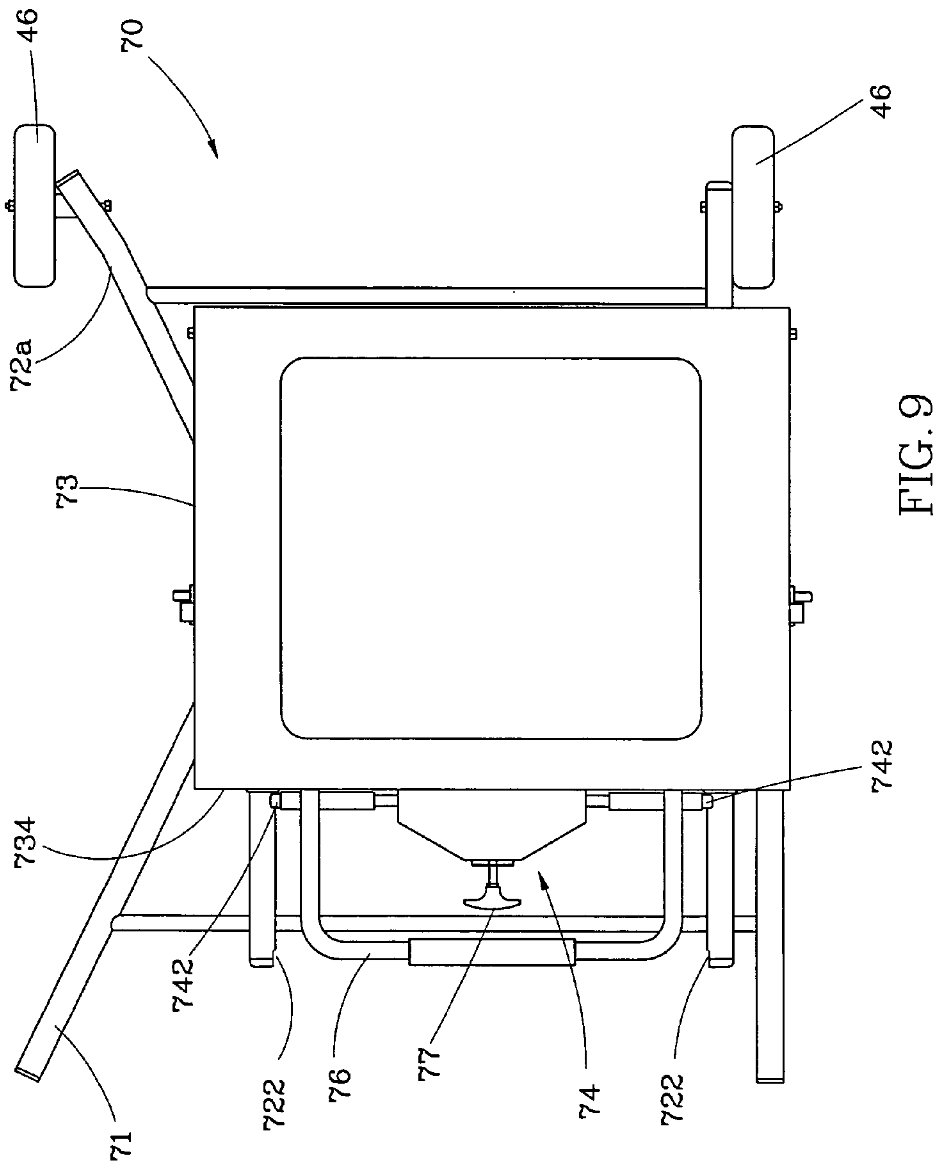
FIG. 9 is a top view showing the collapsible stand in a folded position according to the second preferred embodiment of the present invention.
Figure 10:
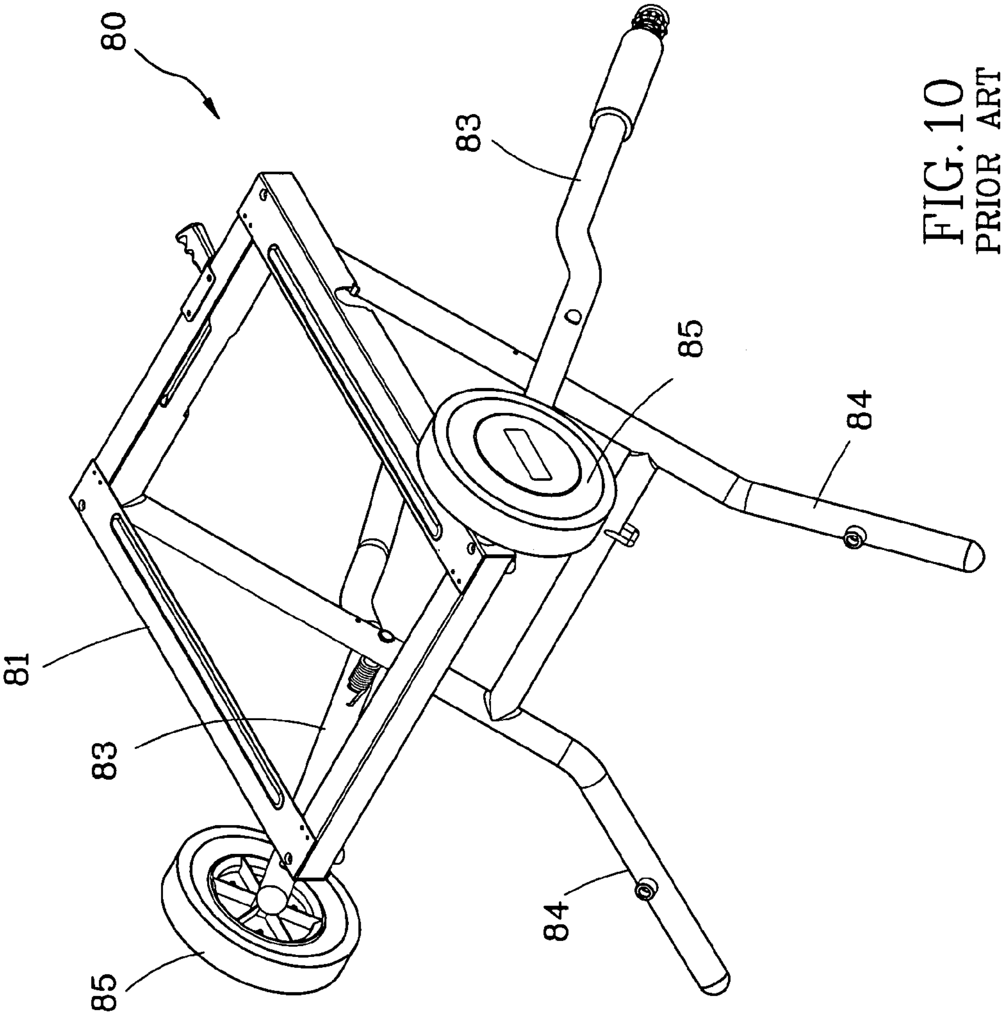
FIG.10 PRIOR ART
FIG. 10 is a perspective view showing a collapsible stand according to the prior art.
Figure 11:
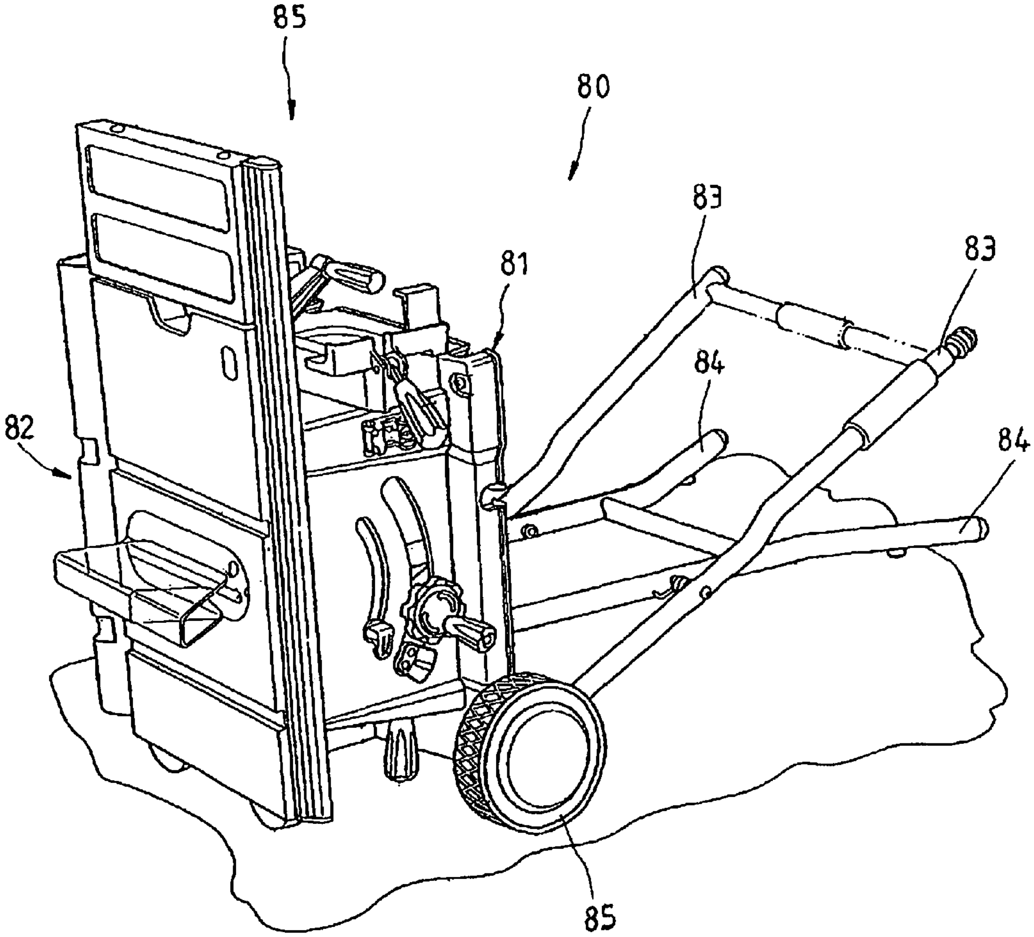
FIG.11 PRIOR ART
FIG. 11 is a schematic drawing showing the use of the collapsible stand of FIG. 10.
Figure 12:
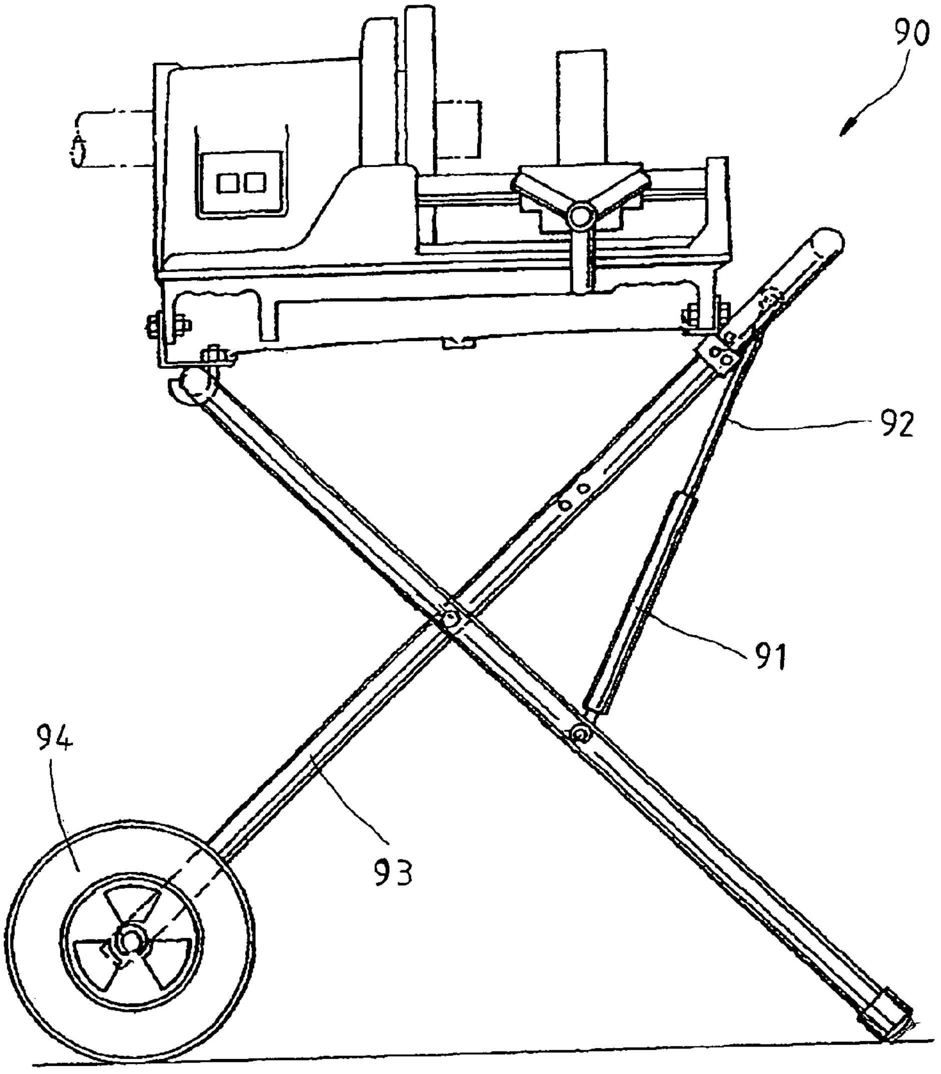
FIG.12 PRIOR ART
FIG. 12 is a side view of a collapsible stand according to another prior art design.

FIGS. 7-9 show a collapsible stand 70 in accordance with a second preferred embodiment of the present invention. This second embodiment is substantially similar to the aforesaid first preferred embodiment with the exceptions outlined hereinafter.

According to this embodiment, the two first legs 71 are not arranged in parallel. One first leg 71 has a lower half portion curved outward at an angle and obliquely extending forward relative to the platform 73. The two second legs 72*a* are also not arranged in parallel. One second leg 72*a* has a lower half portion curved outward at an angle and obliquely extending backwards relative to the platform 73. The two outward curved legs 71 and 72*a* are preferably set opposite and away from the side to which the user approaches when operating the machine. The arrangement enables the stand 70 to stably stand on the floor when the user pushes against the stand 70. In view of the requirement for stability, the aforesaid bent portions 45 of the second legs 72*a* may be eliminated so that the wheels 46 directly contact the floor to support the stand 70 stably on the floor.

Further, there are some differences between the locking device 74 of this second embodiment and the locking device 50 of the aforesaid first embodiment. According to this second embodiment, the locking device 74 is installed on the front wall 734 of the front frame part 732 of the platform 73, and the two first links 742 are disposed outside the front frame part 732 to make the rear ends of the two first links 742 visible from the outside of the stand 70. After the stand 70 is folded, the rear ends of the first links 742 respectively press against the side surfaces of the top parts of the second legs 72*a* to hold the stand 70 in the collapsed status. After the stand 70 is spread open, the rear ends of the first links 742 respectively press against terminal surfaces of the top parts of the second legs 72*a*. The terminal surface of the top part of each second leg 72*a* is provided with a locating groove 722 for accommodating the rear end of the corresponding first link 742. Thereby, the locking device 74 fixes the two second legs 72*a* relative to the platform 73 in the spread open position in order to make the first legs 71 and the second legs 72*a* support the platform 73 above the floor at a predetermined height. The locking device 74 further comprises an auxiliary frame 76. The auxiliary frame 76 has a U-shaped profile, which is fixedly connected to the platform 73 and surrounds the operating handle 77. In order to pull the operating handle 77, the user can stop the palm of the hand against the auxiliary frame 76 and then use the fingers to pull the operating handle 77.

Although particular embodiments of the invention have been described in detail for purposes of illustration, various modifications and enhancements may be made without departing from the spirit and scope of the invention. Accordingly, the invention is not to be limited except as by the appended claims.

The invention claimed is:

1. A collapsible stand comprising:

a platform supporting a machine and having two sleeves pivotally connected thereon;

two first legs each having a top end pivotally connected to the platform;

two second legs each of which is pivotally connected to a respective one of the first legs at a pivotal point, and each having a top part inserted through a respective sleeve and slidable along the sleeve resulting in relative movement with respect to the platform;

at least one first biasing member retained on one of the second legs, located between the respective sleeve and the respective pivotal point, and stopped against the respective sleeve;

locking means connected to the platform for fixing the second legs after spreading the stand open such that the first legs and second legs support the platform at a predetermined height;

wherein the top parts of the second legs protrude out of the platform and the first biasing member is compressed after the locking means releases the second legs and the stand is folded;

wherein the locking means comprises two first links and an operating handle, wherein the axial directions of the two first links and the operating handle are substantially perpendicular, the two first links respectively fix the two second legs in a locked position after the stand is spread open, and the operating handle moves the two first links to release the two second legs when the operating handle is pulled; and wherein the locking means further comprises two second links each having an end pivotally coupled to the operating handle and the other end pivotally coupled to a respective first link wherein the locking means further comprises a second biasing member mounted on the operating handle which is deformed when the operating handle is pulled, wherein the operating handle of the locking means is axially movably mounted on the platform and moves in the handle's axial direction when pulled to release the two second legs.

2. The collapsible stand as claimed in claim 1, wherein each of the second legs has a bottom part having a bent portion which acts as a bearing point for supporting the stand on a floor after the stand is spread open.

3. The collapsible stand as claimed in claim 1, wherein each of the top parts of the second legs has a locating hole for receiving a respective first link after the stand is spread open.

4. The collapsible stand as claimed in claim 1, wherein the locking means further comprises two third biasing members respectively mounted on the first links which are deformed when the operating handle moves the first links.

5. The collapsible stand as claimed in claim 1, wherein each of the two first links is disposed outside the platform and has a first end contacting against a respective side surface of the top part of the respective second leg after the stand is folded.

6. The collapsible stand as claimed in claim 5, wherein the top part of each second leg has a terminal surface stopped against the respective first end of the respective first link after the stand is spread open.

7. The collapsible stand as claimed in claim 1, wherein the locking means further comprises an auxiliary frame coupled to the platform and surrounding the operating handle.

8. The collapsible stand as claimed in claim 1, wherein the platform has two receiving spaces, and one of each pair of the first leg and the interconnected second leg is received in a respective one of the receiving spaces and protrudes from the platform after the stand is folded.

9. The collapsible stand as claimed in claim 8, further comprising a handlebar having two ends each of which is fixed to a bottom end of each first leg protruding from the platform after the stand is folded.

10. The collapsible stand as claimed in claim 8, further comprising two pins each of which is connected to a respective one of each pair of the first leg and the interconnected second leg, and that further includes a portion located at an outside relative to the respective first leg and the interconnected second leg, wherein a side wall of each space has a notch which receives the respective pin after the stand is folded, and two swivel hooks, each mounted to the respective side wall near the notch for hooking the pin.

11. The collapsible stand as claimed in claim 10, wherein the respective pin is disposed at the respective pivotal point to act as the pivot for the respective second leg to the respective first leg.

12. The collapsible stand as claimed in claim 1, wherein the first legs are not arranged in parallel, and the second legs are not arranged in parallel.

* * * * *